Nov. 18, 1969 N. W. HURSH ET AL 3,479,566
SHIELD
Filed March 11, 1968 2 Sheets-Sheet 1

INVENTORS
NEAL W. HURSH
RONALD R. MOORELAND
BY Kenneth R. Schaefer
Attorney

SHIELD

Filed March 11, 1968 2 Sheets-Sheet 2

INVENTORS
NEAL W. HURSH
RONALD R. MOORELAND
BY Kenneth R. Schaefer
Attorney

United States Patent Office 3,479,566

Patented Nov. 18, 1969

3,479,566

SHIELD

Neal W. Hursh and Ronald R. Mooreland, Indianapolis, Ind., assignors to RCA Corporation, a corporation of Delaware Filed Mar. 11, 1968, Ser. No. 712,173

Int. Cl. H02b *1/20, 11/06;* H05k *9/00*

U.S. Cl. 317—103 11 Claims

ABSTRACT OF THE DISCLOSURE

An enclosure and mounting socket assembly is used for a high voltage rectifier in a television receiver. A metallic box-shaped shield surounds the horizontal deflection output transformer and associated high voltage rectifier. A sleeve of insulating material is mounted within a hole in the shield. An inner wall of insulating material is joined at one end to the sleeve and supports at its opposite end a terminal receiving socket in which the rectifier is mounted. A cup-shaped member of X-radiation absorptive material is mounted within the sleeve over a portion of the socket remote from the rectifier and overlaps the portion of the shield adjacent the sleeve mounting hole so as to preclude emission outside the shield of X-radiation from the rectifier.

This invention relates to enclosures for high voltage apparatus and particularly to protective enclosures for shielding high voltage rectifiers in color television receivers to minimize arcing, shock and X-radiation hazards which may be associated with the rectifier and related circuit components.

It has been the practice to place certain television receiver components such as the horizontal deflection output transformer and its associated high voltage rectifier within a protective enclosure for protection of servicing personnel and viewers. Examples of such enclosures are shown in U.S. Patent No. 3,201,653, entitled "Shield," granted Aug. 17, 1965, to Walter M. Nuss and U.S. Patent No. 3,273,021, entitled "Enclosure for High Voltage Apparatus," granted Sept. 13, 1966, to John Stark, Jr., Bethel E. Denton and James W. McLeod, Jr., each of which patents are assigned to Radio Corporation of America, the assignee of the present invention.

Typically, in television receivers, a high voltage of the order of 20,000 to 25,000 volts is produced for operation of the image reproducing cathode ray tube by rectification of flyback voltage pulses which occur in the horizontal deflection circiut during line retrace intervals. The higher voltage is associated with color television receivers while the lower voltage is associated with monochrome receivers. In a color television receiver, during the line scanning interval (as opposed to the line retrace interval), the high voltage rectifier is subjected to a reverse voltage which normally is greater than the high voltage referred to above (that is, the cathode of the rectifier is at the high voltage while the anode thereof is at a lesser voltage of opposite polarity and the two voltages "add" across the rectifier). Normally, no current flows in the high voltage rectifier under such reverse voltage conditions. However, irregularities may exist in the structure of the high voltage rectifier such that a few electrons, when subjected to the high electric field gradient produced in the rectifier during line scanning may be pulled from the anode electrode of the rectifier and accelerated towards other tube elements. These electrons, upon striking the cathode or other electrode support rods within the rectifier under the high field conditions, could produce X-radiation. Accordingly, the enclosure in which the high voltage rectifier is mounted is constructed in a manner to provide an effective shield to prevent the propagation of X-radiation outside the enclosure during normal and abnormal operating conditions of the high voltage rectifier while preventing arcing between high and low voltage conductors outside of the rectifier.

In accordance with one aspect of the present invention, a metallic, substantially closed box structure is provided with a hole through one surface within which a terminal pin receiving socket assembly of insulating material is mounted. The socket assembly comprises inner and outer walls of insulating material joined at one end and a socket base closing the end of the inner wall remote from its junction with the outer wall. A cup-shaped member of X-radiation absorptive material extends between the inner and outer walls and overlies the portion of the socket base adjacent the free end of the outer wall.

The novel features that are considered characteristic of this invention are set forth with particularity in the appended claims. The invention itself, however, both as to its organization and method of operation as well as additional objects thereof will best be understood from the following description when read in connection with the accompanying drawing in which:

Figure 1:
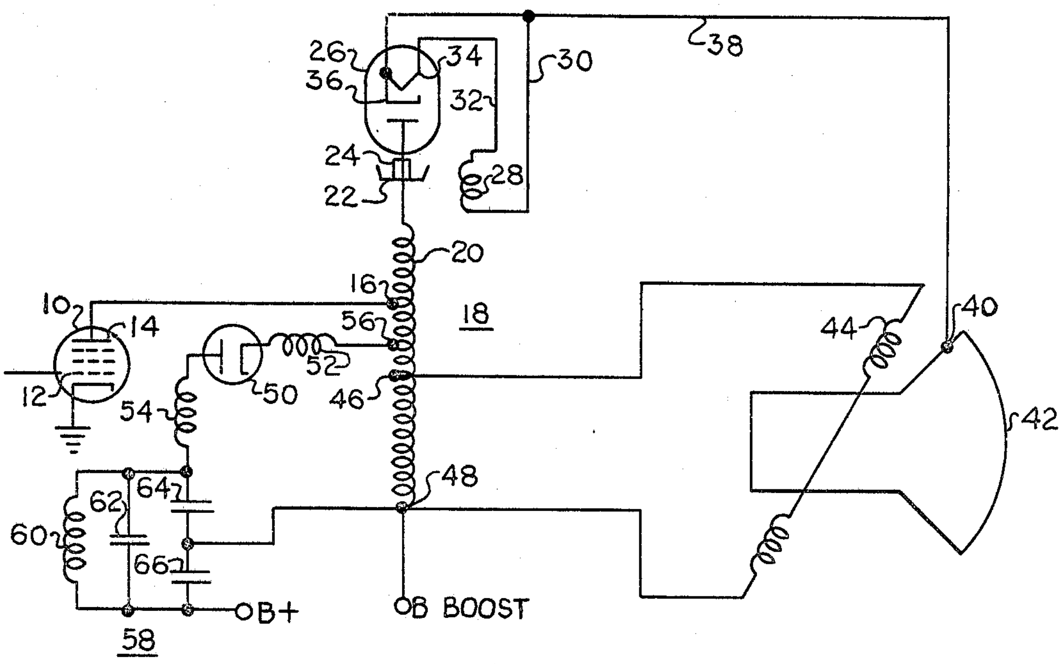
FIGURE 1 is a partial schematic circuit diagram of a horizontal deflection (line scanning) and high voltage generating system for a television receiver in which the shielding arrangement according to this invention may be used.

Referring to FIGURE 1, a horizontal deflection output tube 10 is supplied at its control grid 12 with a suitable deflection voltage of sawtooth waveform. An anode electrode 14 of output tube 10 is coupled to a primary winding tap 16 of a horizontal output transformer 18 arranged in an autotransformer configuration. A high voltage secondary winding 20 terminates in a high voltage terminal 22 which is arranged for connection to an anode cap 24 of a high voltage rectifier tube 26. Heater current for rectifier 26 is supplied via a heater winding 28 associated with transformer 18. Winding 28 is coupled via leads 30, 32 across a heater 34 in tube 26. Lead 30 is coupled to a cathode electrode 36 in tube 26 and also to a high voltage lead 38 which, in turn, is coupled to an ultor electrode 40 of an image reproducing cathode ray tube or kinescope 42. A horizontal deflection winding 44 associated with kinescope 42 is coupled between a tap 46 and a low voltage end 48 of transformer 18. A damping rectifier 50 is coupled by means of inductors 52 and 54 between a further tap 56 on transformer 18 and a resonant efficiency circuit 58. Efficiency circuit 58 comprises an inductor 60, a parallel capacitor 62 and a pair of capacitors 64 and 66 coupled in series across inductor 60. Operating voltage (B+) is supplied to the output tube 10 at the junction of inductor 60, capacitor 62 and capacitor 66. An auxiliary voltage supply (B Boost) is provided at the junction of capacitors 64 and 66, which junction is returned to the low voltage end 48 of transformer 18.

The above-described circuit is known and is of the type shown and described in RCA Victor Television Service Data 1967 No. T–20, published by RCA Sales Corporation, Indianapolis, Ind.

Figure 3:
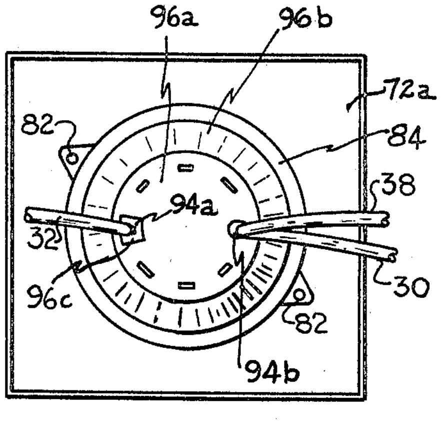
FIGURE 3 is a top view of the enclosure (drawn to a different scale than FIGURE 2) with the top cover removed.

A shielding structure constructed in accordance with the present invention for use in connection with the circuit illustrated in FIGURE 1 now will be described referring to FIGURES 2 and 3. Components shown schematically in FIGURE 1 are indicated in the pictorial representations of FIGURES 2 and 3 by the same reference numerals.

Figure 2:
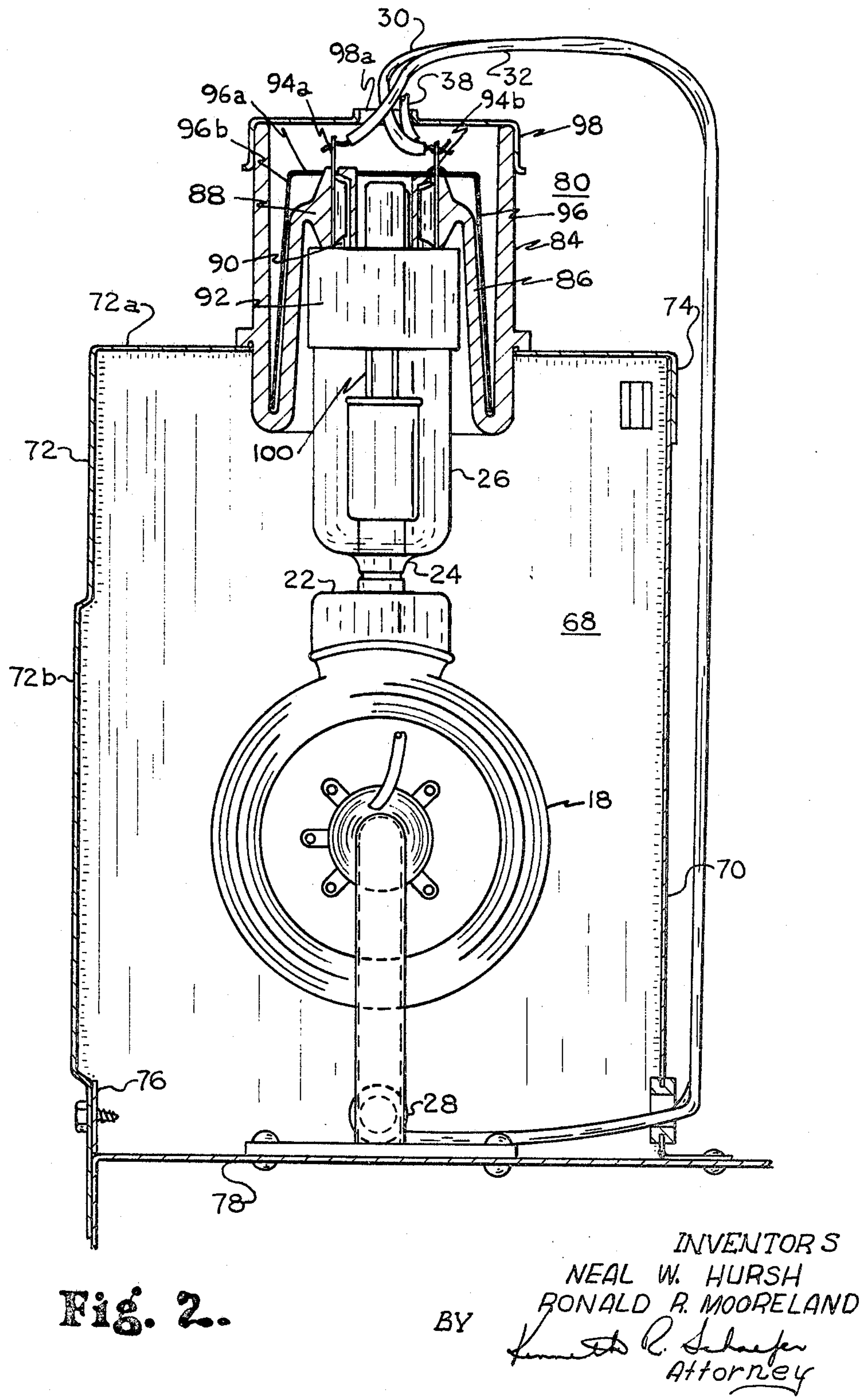
FIGURE 2 is a sectional front elevation of a high voltage enclosure employing a shielding arrangement constructed in accordance with this invention.

Referring to FIGURE 2, a protective enclosure comprises a metallic box-shaped shield member indicated generally by the reference numeral 68. Shield member 68 includes an upstanding three-sided channel 70 arranged to shield transformer 18 and rectifier 26 on three sides. An inverted L-shaped shield member 72 forms the top and fourth side of the protective enclosure and is hinged and slidably mounted on channel 70 in a manner described in detail in the above-mentioned Nuss patent. As described and shown by Nuss, depending flanges 74 are provided along each edge of the horizontally disposed top cover **72*a* and inwardly directed flanges (not shown) are provided along the vertically disposed edges of rear portion 72*b* of shield member 72 to overlap the adjacent portion of channel 70. Inwardly turned flanges 76 are also provided at the lowermost end of channel 70 for securing shield member 72 to channel 70. Shield member 68 and transformer 18 are mounted on a metallic television chassis 78** which provides shielding in a downward direction.

Transformer 18 is provided with a cup-shaped high voltage terminal connector 22 arranged to receive and provide electrical connection to the anode cap 24 of rectifier 26 while heater winding 28 is mounted on a portion of the core of transformer 18 in a well-known manner.

Rectifier tube 26 depends from and is supported by a mounting socket assembly indicated generally by the reference numeral 80. Socket assembly 80 extends through a hole provided in top cover **72*a* and is secured to top cover 72*a* by means of rivets 82 (see FIGURE 3) which pass through ears on the periphery of socket assembly 80**.

Socket assembly 80 comprises a cylindrical outer wall or sleeve of insulating material 84 which depends within enclosure 68 and also extends outside enclosure 68 as will be explained below. A truncated conical or substantially cylindrical inner wall 86 of insulating material is joined to outer wall 84 at its lower extremity and is joined to a terminal pin receiving socket portion 88 at its upper extremity. Walls 84 and 86 and socket portion 88 may be integrally molded of plastic material such as W. R. Grace Company polypropylene No. 460E. The walls 84 and 86 should be of sufficient thickness to withstand voltages in excess of the normal high voltage produced by rectifier 26.

Terminal pins 90 extend from the base 92 of rectifier 26 and are gripped by spring connectors **94*a* and 94*b* which are retained in socket portion 88. Connectors 94*a* and 94*b* are soldered, respectively, to lead 32 and to leads 30 and 38** in accordance with the circuit diagram of FIGURE 1.

A metallic cup-shaped member 96 of X-radiation absorptive material suuh as steel has a base portion **96*a* overlying socket portion 88 and a side wall 96*b* extending between walls 84 and 86 to a point below the top cover 72*a*. Cup-shaped member 96 is soldered to connector 94*b* but is provided with a cut-out portion 96*c* (see FIGURE 3) surrounding connector 94*a* so as to be insulated from connector 94*a***.

An insulating cap 98 having a central aperture **98*a* through which leads 30, 32 and 38 are passed is releasably fastened over the external end of sleeve 84 to complete the assembly. The dimensions of the various portions of assembly 80 are arranged such that the minimum free air path between elements at high voltage (e.g. cup-shaped member 96) and those at low voltage (e.g. top 72*a***) is substantially greater than the minimum free air arc length at the voltages under consideration.

In the operation of the described apparatus, electrons subjected to high accelerating voltages during line scanning intervals may strike the cathode and heater support rods 100 within rectifier 26, causing emission of X-radiation. The combination of enclosure 70, chassis

78 and cup-shaped member 96 is arranged to intercept and prevent escape of substantially all such radiation if it is produced.

It should be noted that while the invention has been described in terms of a particular embodiment utilizing particular materials, various modifications may be made within the scope of the invention. For example, cup-shaped member 96 may be formed of material such as lead or a lead-steel laminate. Furthermore, it should be recognized that shield member 68 may be fabricated of various materials in various geometric shapes.

What is claimed is:

1. A mounting socket assembly for a high voltage rectifier tube comprising
- an outer sleeve of insulating material,
- an inner wall of insulating material joined to one end of said outer sleeve,
- a terminal receiving socket portion joined to said inner wall remote from said one end, and
- an X-radiation absorptive member having a wall portion extending between said outer sleeve and said inner wall.

2. A mounting socket assembly according to claim 1 wherein
- said radiation absorptive member comprises a steel cup.

3. A mounting socket assembly according to claim 1 wherein
- said radiation absorptive member comprises a base portion overlying said socket portion and side wall portions extending from said base portion between said outer sleeve and inner wall.

4. A mounting socket assembly according to claim 3 wherein
- said inner wall and outer sleeve are formed of material having a voltage breakdown capability exceeding the normal operating voltage associated with said rectifier tube.

5. A mounting socket assembly according to claim 4 wherein
- said inner wall and said outer sleeve each are substantially cylindrical in form.

6. A mounting socket assembly according to claim 5 wherein
- said outer sleeve, said inner wall and said socket portion are integrally molded.

7. In a television receiver including a high voltage rectifier and an associated transformer, a shielding enclosure comprising, in combination,
- a metallic box-shaped shield having a hole in one wall thereof,
- a mounting socket assembly for said rectifier extending through said hole into said shield,
- said socket assembly comprising,
- an outer sleeve of insulating material,
- an inner wall of insulating material joined to one end of said outer sleeve,
- a socket portion joined to said inner wall spaced from said one end for receiving terminal pins of said rectifier, and
- a cup-shaped X-radiation absorptive member extending between said outer sleeve and said inner wall.

8. The combination according to claim 7 wherein
- said cup-shaped member overlies said socket portion and extends into said shield.

9. The combination according to claim 8 wherein said cup-shaped member and shield are of steel construction and said socket assembly is of integrally molded plastic construction.

10. The combination according to claim 9 wherein said inner wall and outer sleeve extend outwardly and inwardly beyond said one wall of said shield a sufficient distance to prevent arcing between said shield and additional components during operation of said television receiver.

11. In a television receiver including a high voltage rectifier, a shielding enclosure comprising:

a metallic box-shaped shield having a hole in one wall thereof;

a mounting socket assembly for said high voltage rectifier extending through said hole into said shield;

a cup-shaped X-radiation absorptive member extending from said mounting socket assembly through said hole in said metallic box-shaped shield;

and a sleeve of insulating material associated with said cup-shaped member and interposed between said cup-shaped member and said box-shaped shield.

References Cited

UNITED STATES PATENTS

| | | | |
|---|---|---|---|
| 2,327,586 | 8/1943 | Atlee | 313—59 |
| 2,915,734 | 3/1955 | Alden | 339—143 |
| 3,201,653 | 8/1965 | Nuss | 317—99 |

LEWIS H. MYERS, Primary Examiner

G. P. TOLIN, Assistant Examiner

U.S. Cl. X.R.

174—35; 339—143